(12) United States Patent
Hatanaka et al.

(10) Patent No.: US 7,250,467 B2
(45) Date of Patent: Jul. 31, 2007

(54) ROOM-TEMPERATURE-CURABLE ORGANOPOLYSILOXANE COMPOSITION

(75) Inventors: Hidekatsu Hatanaka, Chiba (JP); Harumi Kodama, Chiba (JP); Masayuki Onishi, Chiba (JP); Hiroji Enami, Chiba (JP); Koji Nakanishi, Chiba (JP)

(73) Assignee: Dow Corning Toray Silcone Co., Ltd., Tokyo (JP)

( * ) Notice: Subject to any disclaimer, the term of this patent is extended or adjusted under 35 U.S.C. 154(b) by 142 days.

(21) Appl. No.: 10/482,904

(22) PCT Filed: Jul. 26, 2002

(86) PCT No.: PCT/JP02/07642

§ 371 (c)(1),
(2), (4) Date: Jan. 5, 2004

(87) PCT Pub. No.: WO03/010227

PCT Pub. Date: Feb. 6, 2003

(65) Prior Publication Data

US 2004/0176517 A1    Sep. 9, 2004

(30) Foreign Application Priority Data

Jul. 26, 2001 (JP) ............................. 2001-226180
Jul. 26, 2001 (JP) ............................. 2001-226181

(51) Int. Cl.
*C08L 83/06* (2006.01)

(52) U.S. Cl. ..................... 524/588; 524/403; 528/901

(58) Field of Classification Search ................ 524/403, 524/588; 528/901
See application file for complete search history.

(56) References Cited

U.S. PATENT DOCUMENTS 5,098,980 A * 3/1992 Saruyama et al. ............ 528/15
5,260,372 A 11/1993 Toporcer et al.
5,625,022 A * 4/1997 Onishi ......................... 528/15

FOREIGN PATENT DOCUMENTS

EP        0483776 A2    5/1992

* cited by examiner

*Primary Examiner*—Kuo-Liang Peng
(74) *Attorney, Agent, or Firm*—Howard & Howard Attorneys, P.C.

(57) ABSTRACT

A room-temperature-curable organopolysiloxane composition comprising:
(A) an organopolysiloxane having 1.5 or more end groups having at least one hydroxyl group on the average;
(B) a silane or a siloxane oligomer having three or more silicon-bonded hydrolyzable groups;
(D) an inorganic powder; and either
(C) microparticles of thermoplastic resin containing a platinum compound having an average diameter from 0.1 to 20 μm; or
(C1) a platinum compound; and
(C2) an organosiloxane oligomer which contains aryl and alkenyl groups and has 8 or less silicon atoms in each molecule and which contains in each molecule at least one divalent organosiloxane as represented by the formula:

—$(R^2)(R^3)SiO$—$(R^2)(R^3)Si$—, (where $R^2$ is an aryl group, and $R^3$ is an alkenyl group), in a quantity of at least 2 moles of component (C2) per 1 mole platinum atoms in component (C1).

18 Claims, No Drawings

ROOM-TEMPERATURE-CURABLE ORGANOPOLYSILOXANE COMPOSITION

The present invention relates to a room-temperature-curable organopolysiloxane composition, in particular, to a room-temperature-curable organopolysiloxane composition that is turned, after curing, into a cured silicone body with excellent flame-retarding properties, which properties are not lost even after long-time exposure to high temperatures.

BACKGROUND ART

Room-temperature-curable organopolysiloxane compositions with flame-retarding properties imparted to them by adding a platinum compound and an inorganic filler are known in the art. For example, Japanese Patent Application Publication No. (hereinafter referred to as "Kokai") H4-18451 discloses a room-temperature-curable organopolysiloxane composition consisting of a dimethylpolysiloxane having both molecular terminals capped with trimethoxysilyl groups, silica powder, quartz powder, zinc carbonate, a platinum compound (a platinum-ethylene complex obtained by reacting chloroplatinic acid with ethylene and dehydrochlorinating the reaction product), a triethylamine salt, and dibutyltin dioctoate.

Furthermore, Kokai H5-230376 discloses a composition comprising a dimethylpolysiloxane having both molecular terminals capped with hydroxyl groups, an alumina hydrate, carbon black, a platinum compound {a complex of platinum with a vinylsiloxane (1,3-divinyl-1,1,3,3-tetramethyidisiloxane)}, and methyltris-(methylethylketoxime)-silane.

Another publication, Kokai H5-125285 discloses a room-temperature-curable organopolysiloxane composition consisting of a dimethylpolysiloxane having both-molecular terminals capped with hydroxyl groups, aluminum hydroxide powder, calcium carbonate, a platinum compound (an isopropanol solution of chloroplatinic acid), and vinyltris-(methylethylketoxime) silane.

However, the aforementioned room-temperature-curable organopolysiloxanes admixed with platinum compounds normally have low storage stability, and after long-term storage, are subject to gradual decrease in flame-retarding properties. In particular, flame-retarding properties drop most significantly in a cured body made from the aforementioned composition after long-term storage at high temperatures. This limits the field of application of the aforementioned compositions.

It is an object of the present invention to provide a room-temperature-curable organopolysiloxane characterized by excellent flame-retarding properties which are preserved in a cured silicone article, made from the aforementioned composition, even after long-term storage at high temperatures.

DISCLOSURE OF THE INVENTION

The above problems can be solved by admixing a room-temperature-curable organopolysiloxane composition with a flame-retarding agent in the form of specific finely-divided particles of thermoplastic resin containing a platinum compound.

The present invention relates to a room-temperature-curable organopolysiloxane composition comprising:

(A) 100 parts by weight of an organopolysiloxane having a viscosity from 100 to 500,000 mPa·s at 25° C. and having in one molecule 1.5 or more end groups represented by the general formula: $(X)_a R^1_{3-a} Si-$, where each X is independently a hydroxyl group or a hydrolyzable group, each $R^1$ is independently a monovalent hydrocarbon group or a halogen-substituted monovalent hydrocarbon group, and a is 1, 2, or 3;

(B) 0.01 to 40 parts by weight of a cross-linking agent selected from a silane or a siloxane oligomer, where the cross-linking agent has three or more silicon-bonded hydrolyzable groups per molecule; and (C) microparticles of a thermoplastic resin containing a platinum compound in such an amount that the content of metallic platinum in component (C) is within the range of 0.01 to 5 wt. %, where the microparticles have an average diameter from 0.1 to 20 μm, component (C) is present in an amount sufficient to provide 1 to 2,000 ppm of metallic platinum in the composition; and (D) 5 to 300 parts by weight of an inorganic powder.

The present invention further relates to a room-temperature-curable organopolysiloxane composition comprising:

(A) 100 parts by weight of an organopolysiloxane having a viscosity from 100 to 500,000 mPa·s at 25° C. and having in one molecule 1.5 or more end groups represented by the following general formula: $(X)_a R^1_{3-a} Si-$, where each X is independently hydroxyl group or a hydrolysable group, each $R^1$ is independently a monovalent hydrocarbon group or a halogen-substituted monovalent hydrocarbon group, and a is 1, 2, or 3;

(B) 0.01 to 40 parts by weight of a cross-linking agent selected from silane or a siloxane oligomer, where the cross-linking agent has three or more silicon-bonded hydrolyzable groups per molecule;

(C1) a platinum compound present in an amount such that metallic platinum is present in an amount of 1 to 2,000 ppm based on the weight of the composition;

(C2) an organosiloxane oligomer, where the organosiloxane oligomer contains aryl and alkenyl groups, the organosiloxane oligomer has 8 or less silicon atoms per molecule, and the organosiloxane oligomer contains in each molecule at least one divalent organosiloxane group represented by the formula $-(R^2)(R^3)SiO-(R^2)(R^3)Si-$, where $R^2$ is an aryl group, and $R^3$ is an alkenyl group;

where the organosiloxane oligomer is present in a quantity such that the composition contains at least 2 moles of component (C2) per 1 mole of platinum atoms in component (C1); and (D) 5 to 300 parts by weight of an inorganic powder.

In accordance with the invention, component (A) is an organopolysiloxane having a viscosity from 100 to 500,000 milliPascal·seconds (mPa·s) at 25° C. and having in one molecule 1.5 or more end groups represented by the following general formula: $(X)_a R^1_{3-a} Si-$, wherein X is a hydroxyl group or a hydrolyzable group, $R^1$ is a monovalent hydrocarbon group or a halogen-substituted monovalent hydrocarbon group, and a is 1, 2, or 3. Cross-linking occurs when component (A) reacts with component (B). In the above formula, $R^1$ can be represented by a monovalent hydrocarbon group such as methyl group, ethyl group, isopropyl group, hexyl group, octadecyl group, or a similar alkyl group; vinyl group, hexenyl group, or a similar alkenyl group; cyclohexyl group, cyclopentyl group, or a similar cycloalkyl group; benzyl group, β-phenylethyl group, or a similar arylalkyl group; phenyl group, tolyl group, or a similar aryl group. In the above formula, $R^1$ may also comprise a halogen-substituted monovalent hydrocarbon (with a hydrogen atom of this group being substituted by a halogen atom) such as 1,1,1-trifluoropropyl group, perfluoropropyl group, or a similar organic group. In one molecule, the aforementioned $R^1$ groups can be the same or different. In the above formula, X designates hydroxyl group, or an alkoxy group, oxime group, acetoxy group, propenyloxy group, amino group, aminoxy group, amido group, or a similar hydrolyzable group. For ease of synthesis and for better balance of mechanical properties, it is recommended that a majority of all $R^1$ groups be methyl groups.

A typical example of the aforementioned organopolysiloxane is a diorganopolysiloxane represented by the following general formula:

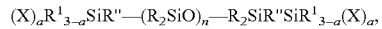

where $R^1$ and X are the same as defined above, and R" is oxygen atom or an alkylene group. R is the same monovalent hydrocarbon group or a halogen-substituted monovalent hydrocarbon group as $R^1$; a is 1, 2, or 3; and n is such a value that provides 25° C. viscosity of the aforementioned organopolysiloxane within the range of 100 to 500,000 mPa·s, preferably within the range of 500 to 100,000 mPa·s. The present component may comprise a mixture of compounds with different degrees of polymerization and with different viscosities, or a mixture of compounds having different substituents.

Methods of preparation of such diorganopolysiloxanes are known in the art. For example, a diorganopolysiloxane where X is hydroxyl group and R" is oxygen atom in the above formula, can be easily produced by an equilibrium polymerization of octamethylcyclotetrasiloxane with the use of an alkali or an acidic catalyst in the presence of water or a silane compound as a polymerization stopping agent. Similarly, a diorganopolysiloxane where X is an alkoxy group and R" is oxygen atom in the above formula, can be produced by means of dealcoholization and condensation of a silanol-capped diorganopolysiloxane with a tetraalkoxysilane, alkyltrialkoxysilane, or a dialkyldialkoxysilane in the presence of a condensation-reaction catalyst. Furthermore, a diorganopolysiloxane where X is an alkoxy group and R" is ethylene group in the above formula can be produced by means of a hydrosilylation reaction of a vinyl-capped diorganopolysiloxane with a hydrogentrialkoxysilane, a hydrogenmethyldialkoxysilane, or a hydrogendimethylalkoxysilane in the presence of a platinum-compound catalyst.

Component (B) is a silane or a siloxane oligomer that functions as a cross-linking agent. The following are specific examples of such silanes or siloxane oligomers: tetramethoxysilane, tetraethoxysilane, methyltrimethoxysilane, ethyltrimethoxysilane, vinyltrimethoxysilane, 3,3,3-trifluoropropyltrimethoxysilane, β-cyanoethyltrimethoxysilane, tetraisopropoxysilane, tetrabutoxysilane, phenyltrimethoxysilane, octadecyltrimethoxysilane, tetra (β-chloroethoxy) silane, tetra (2,2,2-trifluoroethoxy) silane, propyltris (δ-chlorobutoxy) silane, methyltris (methoxyethoxy) silane, or a similar alkoxysilane; methylpolysilicate, dimethyltetramethoxydisiloxane, or a similar alkoxysiloxane; methyltris (methylethylketoxime) silane, vinyltris (methylethylketoxime) silane, phenyltris (methylethylketoxime) silane, methyl (diethylketoxime) silane, tetra (methylethylketoxime) silane, methyltris (cyclohexylamino) silane, vinyltris (n-butylamino) silane, methyltris (N-butylacetoamide) silane, methyltris (N-cyclohexylacetoamide) silane, methyltris (N,N-diethylaminoxy) silane, 1,2,3,4-tetramethyl-1-ethyl-2,3,4-tris (N,N-diethylaminoxy) cyclotetrasiloxane, methyltri (isopropenoxy) silane, vinyltris (isopropenoxy) silane; and products of partial hydrolyzation and condensation of the aforementioned compounds. It is recommended to add this component in an amount from 0.01 to 40 parts by weight, preferably 0.1 to 15 parts by weight for each 100 parts by weight of component (A).

Component (C) is in the form of microparticies of a thermoplastic resin containing a platinum compound. This component imparts flame-retarding properties to a cured body formed from the composition of the present invention. Particles of component (C) comprise a platinum compound and a thermoplastic resin and have an average diameter from 0.1 to 20 micrometers (μm). They contain a platinum compound in such an amount that the content of metallic platinum therein is within the range of 0.01 to 5 wt. %. The aforementioned range of the particle diameter is recommended because, if the particle diameter is less than 0.1 μm, it would be difficult to admix this component in an uncured state, and if the particle diameter exceeds 20 μm, then it would be difficult to efficiently expel the platinum compound from the microparticles of the thermoplastic resin during burning, whereby flaine-retarding properties will be reduced. As has been mentioned above, it is recommended to use a platinum compound in such an amount that the content of metallic platinum therein is within the range of 0.01 to 5 wt. %, in particular, from 0.05 to 2 wt. %. If the metallic platinum is contained in an amount less than 0.01 wt. %, the addition of the aforementioned platinum-containing microparticles of the thermoplastic resin will not noticeably improve the flame-retarding properties, and if the added amount exceeds 5 wt. %, it would be difficult to retain the platinum compound within the microparticles of the thermoplastic resin.

Although there are no special limitations with regard to the shape of the platinum-containing microparticles of the thermoplastic resin as-component (C), it is recommended, from the point of view of better reproducibility of stable flame-retarding properties, to use particles of a spherical shape.

Component (C) should be used in such an amount that the content of the platinum compound in component (C) would correspond to 1 to 2,000 ppm of metallic platinum in the composition. The content of the metallic platinum in an amount of less than I ppm will not provide sufficient flame-retardation properties, while the content of metallic platinum exceeding 2000 ppm will decrease flame-retarding properties and will not be economically justified.

There are no special restrictions with regard to the type of the thermoplastic resin that constitutes component (C), provided that this resin acquires plasticity when heated. However, thermoplastic resins that poison or deactivate the platinum compounds are not recommended for use. The aforementioned thermoplastic resins preferably have a glass transition point within the range from 40 to 250° C. If the glass transition point is below 40° C., it would be difficult to produce the microparticles of the thermoplastic resin, and they may melt under the effect of shear heat generated during mixing with other components. If the glass transition point exceeds 250° C., it would be difficult to efficiently release the platinum compound and obtain improved flame-retarding properties.

Thermoplastic resins suitable for use in component (C) can be represented by a silicone resin, polysilane resin, polycarbonate resin, poly(methylmethacrylate) resin, a copolymer of methylmethiacrylate and butylmethacrylate, or a similar acrylic-type resin, a polyester resin, polyethylene resin, polystyrene resin, poly(vinylchloride), poly(vinylidene chloride), a copolymer of vinylchloride and vinylidene chloride, a poly(acrylonitrile) resin, a copolymer of an allylonitrile and a styrene, a copolymer of acrylonitrile and styrene; a copolymer of acrylonitrile, butadiene, and styrene; a polyamide resin, cellulose acetate, or a similar cellulose ester resin, a celluloseacetate butyrate resin, and a poly(phenyleneoxide) resin.

The silicone resin suitable for use in component (C) can be exemplified by a resin composed of monophenylsiloxane units, diphenylsiloxane units, and dimethylsiloxane units, a resin composed of monophenylsiloxane units and dimethylsiloxane units, and a resin composed of monophenylsiloxane units and methylvinylsiloxane. The polysilane resin can be represented, e.g., by a resin composed of methylphenylsilane units and dimethylsilane units. Most preferable among the above are silicone and polycarbonate resins, while of these two, polycarbonate resins are characterized by the highest flame-retarding and heat-resistant properties.

The platinum compound of component (C) can be represented by chloroplatinic acid, an alcohol-modified chloroplatinic acid, an olefin complex of platinum, a diketone complex of platinum or chloroplatinic acid, and a divinyltetraorganodisiloxane (e.g., 1,3-divinyltetramethyidisiloxane) complex of platinum or chloroplatinic acid. The divinyltetraorganodisiloxane complex of platinum or chloroplatinic acid, which is the most preferable from the point of view of higher activity and better flame-retarding properties, can be prepared by a method described in Kokai H11-42436, i.e., by causing a reaction between the chloroplatinic acid and the divinyltetraorganodisiloxane in an alcoholic solution and in the presence of sodium bicarbonate. The reaction product is then combined with toluene, and the alcohol is removed by distillation. As a result, a divinyltetraorganodisiloxane complex of platinum is produced.

Platinum-containing microparticles of the thermoplastic resin as component (C) and methods of its preparation are known in the art. For example, as described in Kokai S58-37053, such particles can be produced by dissolving a platinum compound and a thermoplastic silicone resin in toluene, drying the obtained solution, thus obtaining a solid substance comprising the platinum compound and the thermoplastic silicone resin, and then grinding the obtained solid substance.

Another method, described in Kokai H2-4833, consists of dissolving a platinum compound and a thermoplastic silicone resin in a low-boiling-point solvent such as methylene chloride, dripping the obtained solution into an aqueous solution of a surface-active agent, thus producing an oil/water emulsion, gradually removing the solvent, and recovering the platinum and the resin in the form of microparticles.

A method disclosed in Kokai H4-29748 and Kokai H7-41678 consists of dissolving a platinum compound and a thermoplastic resin in toluene, dichloromethane, or a similar solvent, spraying the solution into a hot flow of nitrogen gas in a spray dryer, and producing the microparticles by evaporating the solvent.

Component (C) should be used in such an amount that the content of the platinum compound in component (C) would correspond to 1 to 2,000 ppm of metallic platinum in the composition. This is because the content of the metallic platinum in an amount of less than 1 ppm will not provide sufficient flame-retardation properties, while the content of metallic platinum exceeding 2000 ppm will decrease flame-retarding properties and will not be economically justified.

Component (C1) and Component (C2) may also be used for imparting flame-retarding properties to a cured body formed from the composition of the present invention, instead of Component (C).

Component (C1) imparts flame-retarding properties to an article obtained by curing the composition of the invention. Component (C1) can be exemplified by a chloroplatinic acid, alcohol-modified chloroplatinic acid, a platinum complex of olefin, a platinum or a chloroplatinic-acid complex of diketone, and platinum or chloroplatinic acid complex of 1,3-divinyltetramethyidisiloxane. Most preferable among the above compounds is a platinum complex having as a ligand an organosiloxane which contains alkyl and alkenyl groups having in one molecule at least one divalent organosiloxane group as shown by the following formula:

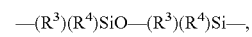

—(R$^3$)(R$^4$)SiO—(R$^3$)(R$^4$)Si—, where R$^4$ is an alkyl group with 6 or less carbon atoms, and R$^3$ is the same as defined above, and containing in one molecule an alkyl group and an alkenyl group with 8 or less silicon atoms, or a mixture of the aforementioned organosiloxane with the aforementioned platinum complex. This component (C1) may be the aforementioned platinum complex, but it may also be a mixture of the aforementioned platinum complex with organosiloxane oligomer identical to or of the same type as the (alkyl+alkenyl)-containing organosiloxane oligomer coordinated in the platinum complex. (Alkyl+alkenyl)-containing organosiloxane oligomer not coordinated within the platinum complex should be present generally at no more than 30 moles per 1 mole platinum atoms in the platinum complex.

It is known in the art to produce component (C1) by reacting, with heating, an (alkyl+alkenyl)-containing organosiloxane oligomer with a haloplatinic acid or a haloplatinic acid salt (see Japanese Patent Publication No. (hereinafter referred to as "Kokoku") S42-22924). In the preparation of component (C1) by this method, the alkenyl group in the starting (alkyl+alkenyl)-containing organosiloxane oligomer is generally vinyl group. Moreover, it is preferred that the alkyl group be methyl group considering the economics and prevention of side reactions during preparation of component (C1). Although no specific restriction is placed on groups which may be present in addition to the alkenyl and alkyl groups, it is necessary in particular to avoid aryl groups since this causes a reduction in the platinum yield in the preparation of component (C1).

Examples of this (alkyl+alkenyl)-containing organosiloxane oligomer are 1,3-divinyltetramethyldisiloxane and 1,3,5,7-tetravinyltetramethylcyclotetrasiloxane. It is recommended to add component (C1) in such an amount that the content of metallic platinum is within the range of 1 to 2000 ppm based on the weight of the composition. The content of the metallic platinum in an amount of less than 1 ppm will not provide sufficient flame-retardation properties, while the content of metallic platinum exceeding 2000 ppm will decrease flame-retarding properties and will not be economically justified.

Component (C2) is added for improving stability of component (C1). Component (C2) is an organosiloxane oligomer which contains aryl and alkenyl groups and has 8 or less silicon atoms in each molecule and which contains in each molecule at least one divalent organosiloxane group as represented by the formula:

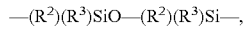
—(R²)(R³)SiO—(R²)(R³)Si—, where R² is an aryl group, and R³ is an alkenyl group. Component (C2) is added in a quantity of at least 2 moles of component (C2) per 1 mole platinum atoms in component (C1). In the above formula, the aryl group can be represented by phenyl group and tolyl group. The phenyl group is preferable. The alkenyl group can be represented by vinyl group, allyl group, butenyl group, and hexenyl group. Of these, the vinyl group is preferable. The aforementioned organopolysiloxane can be exemplified by 1,3-divinyl-1,3-diphenyldimethyldisiloxane and 1,3-divinyltetraphenyidisiloxane.

Components (C1) and (C2) can be mixed directly with components (B) and (D). Alternatively, components (C1) and (C2) may be premixed, as disclosed in Japanese Patent No. 2974692. The obtained mixture can be further mixed with components (A), (B), and (D). Furthermore, when component (C1) is a platinum complex having as a ligand an organosiloxane oligomer which contains alkyl and alkenyl groups having in one molecule at least one divalent organosiloxane group shown by the following formula:

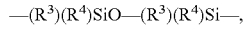
—(R³)(R⁴)SiO—(R³)(R⁴)Si—, (where R⁴ is an alkyl group with 6 or less carbon atoms, and R³ is the same as defined above) and containing in one molecule an alkyl group and an alkenyl group with 8 or less silicon atoms, components (C1) and (C2) can be mixed, and after the organosiloxane oligomer contained in component (C1) is removed from the obtained mixture by distillation in vacuum, the mixture can be further mixed with components (A), (B), and (D). Thus, according to the latter method, a platinum catalyst composition with an even more superior storage stability can be prepared by removal of part of the platinum-coordinated (alkyl+alkenyl)-containing organosiloxane oligomer and part or all of the non-platinum-coordinated (alkyl+alkenyl)-containing organosiloxane oligomer in component (C1) and by substitution with the (phenyl+alkenyl)-containing organosiloxane oligomer of component (C2). The platinum catalyst composition of the aforementioned type is characterized by a better high-temperature stability and a better stability against other substances present in the system than the platinum/siloxane complexes known from the art.

The inorganic powder, component (D), improves flowability of the composition of the invention prior to curing and improves mechanical properties and flame-retarding properties after curing. The following are examples of appropriate inorganic powders: dry-process silica powder, wet-process silica powder, or a similar reinforcing silica powder; quartz powder; diatomaceous earth; aluminum oxide, iron oxide, zinc oxide, titanium oxide, cerium oxide, or a similar metal oxide powder; magnesium hydroxide, aluminum hydroxide, or a similar metal hydroxide powder; calcium carbonate, zinc carbonate, or a similar carbonate powder; talc, clay, mica, carbon black, glass beads; quartz, silica, or similar powders surface-treated with a hydrophobic agent such as trimethylchlorosilane, dimethyidichlorosilane, dimethyldimethoxysilane, hexamethyldisilazane, or octamethylcyclotetrasiloxane, as well as a calcium carbonate powder surface-treated with a fatty acid, or a resin acid. Most preferably among the above are dry-process silica powder, wet-process silica powder, or a similar reinforcing silica powder, quartz powder, cerium oxide powder, titanium oxide powder, carbon black, aluminum oxide powder, aluminum hydroxide powder, magnesium hydroxide powder, calcium carbonate powder, magnesium carbonate powder, and zinc carbonate powder. The dry-process silica powder, especially the one having the surface treated with the aforementioned hydrophobic agent is preferable. And the aforementioned dry-process silica powder can be used in combination with other powders mentioned above (such as quartz powder, cerium oxide powder, titanium oxide powder, carbon black, or a mixture thereof). The most preferable for component (D) is a mixture of dry-process silica powder, quartz powder, cerium oxide powder, and carbon black, and a mixture of dry-process silica powder, quartz powder, cerium oxide powder, carbon black, and titanium oxide powder.

If the amount of aforementioned component (D) added to the composition is too small, it would be impossible to improve mechanical strength and flame-retarding properties, and if it is used in an excessive amount, the composition will be too viscous and will be difficult to handle in production. Therefore, it is recommended to add component (D) in an amount of 5 to 300 parts by weight for each 100 parts by weight of component (A). When component (D) consists of particles having a microscopic diameter, such as a reinforcing silica, light calcium carbonate, or carbon black, it should be used in an amount of 5 to 60 parts by weight. If the particles have a relatively large diameter, it should be used in an amount of 10 to 200 parts by weight.

To increase elongation and to lower the modulus of elasticity, the composition of the present invention can be additionally combined with bifunctional silanes, siloxanes, or both. Such bifunctional silanes and siloxanes can be represented by the following compounds: dimethylbis (N-methylacetoamide silane), dimethylbis (N-ethylacetoamide) silane, diphenylbis (diethylaminoxy) silane, methylphenylbis (diethylaminoxy) silane, 1,2,3,4-tetramethyl-1,2-diethyl-3,4-bis (N,N-diethylaminoxy) cyclotetrasiloxane, diphenyldimethoxysilane, dimethyidimethoxysilane, and a diorganopolysiloxane capped only at one molecular terminal with silicon-bonded hydroxyl group or a hydrolyzable group. It is recommended that such additional components be used in an amount of 0.01 to 20 parts by weight for each 100 parts by weight of component (A). The most optimum amount of the aforementioned additional components is selected with reference to concentration of hydroxyl groups and hydrolyzable groups in component (A) and to the content of moisture in the composition.

If necessary for acceleration of the condensation reaction between components (A) and (B), the composition of the present invention can be additionally combined with a condensation-reaction-accelerating catalyst (curing promotion catalyst). The following are examples of the aforementioned catalysts: lead-2-ethyloctoate, dibutyltin dilaurate, dibutyltin-2-ethylhexoate, dibutyltin dilaurate, dibutyltindiacetylacetoate, dibutyltin tri-2-ethylhexoate, iron-2-ethylhexoate, cobalt-2-ethylhexoate, manganese-2-ethylhexoate, stannous caprylate, tin naphthenate, tin oleate, zinc naphthenate, zinc stearate, titanium naphthenate, or a similar metal salt of a monocarboxylic acid; tetrabutyl titanate, tetraphenyl titanate, tetra-2-ethylhexyl titanate, tetraoctadecyl titanate, triethanolamine titanate, ethyleneglycol titanate, diisopropoxybis (ethylacetate) titanium, diisopropoxybis (acetylacetone) titanium, dibutoxybis (methylacetoacetate)

titanium, or a similar organic titanium compound; hexylamine, dodecylamine, or a similar amine, hexylamine acetate, dodecylamine phosphate, or a similar amine salt; benzyltrimethylammonium acetate, or a similar quaternary ammonium salt; and potassium acetate, or a similar alkali metal salt. The aforementioned catalysts may be mixed in an amount of from 0.001 to 10 parts by weight, and preferably from 0.01 to 10 parts by weight, preferably 0.01 to 5 parts by weight, for each 100 parts by weight of the component (A).

If necessary, within the limits not detrimental to the objects of the invention, the composition of the present invention may incorporate other conventional additives, which are normally added to room-temperature-curable organopolysiloxane compositions, such as pigments, flame-retarding agents, heat-resistance improvers, thermal-conductivity improvers, adhesive promoters, thixotropy imparters, curing retarders, etc. The room-temperature-curable composition of the present invention may constitute a single-liquid or two-liquid type composition. Furthermore, the composition may be of a sag type or a non-sag type.

After curing, the room-temperature-curable organopolysiloxane composition of the invention described above demonstrates excellent flame-retarding properties, which are not lost in a cured product even after long-time exposure to high temperatures. Therefore, the composition of the invention may find application in the areas where such properties are desirable, e.g., for the production of coatings, seals, and adhesives used in electric and electronic devices.

BEST MODE OF CARRYING OUT THE INVENTION

The invention will be further described in more detail with reference to practical and reference examples. In these examples, all parts will be parts by weight, and all viscosities correspond to values measured at 25° C.

Flame-retarding properties of the room-temperature-curable organopolysiloxane compositions were measures by the method specified by UL-94.

Initial Flame-Retarding Properties

The room-temperature-curable organopolysiloxane composition was loaded into a sheet-formation mold and cured for 7 days at 60% relative humidity and at 25° C. As a result, a 0.8 millimeter-thick silicone-rubber sheet was produced. This sheet was cut to form 127 millimeter-long, 12.7 millimeter-wide, and 0.8 millimeter-thick specimens.

Each specimen was fixed vertically in a clamp and ignited from below for 10 seconds (sec.) by the flame of a burner operating on a gaseous methane. The flame height was 20 millimeters (mm). The burner was removed, and the time in seconds until the flame on the specimen was extinguished was measured. Directly after extinguishing, the ignition test was repeated for 10 sec., and the time until the flame on the specimen was extinguished was measured again. Such test was performed on 5 specimens with 10 time-measurement tests. The maximum value out of 10 measurements was taken as the maximum flame-retarding time.

Flame-Retarding Properties after Curing

The 127 mm-long, 12.7 mm-wide, and 0.8 mm-thick specimens obtained for measurement of the initial flame-retarding properties were placed into a 70° C. heating oven and heated for 7 days. The specimens were removed and their heat-retarding properties were measured in the same manner as described above. Furthermore, the 127 mm-long, 12.7 mm-wide, and 0.8 mm-thick specimens obtained for measurement of the initial flame-retarding properties were placed into a 150° C. heating oven and heated for 21 days. The specimens were removed and their heat-retarding properties were measured in the same manner as described above.

REFERENCE EXAMPLE 1

Preparation of Microparticles of a Platinum-Containing Thermoplastic Silicone Resin A 60 weight % (wt. %) toluene solution of a thermoplastic silicone resin was prepared by dissolving in toluene a thermoplastic silicone resin represented by the following average composition formula: $(PhSiO_{3/2})_{0.78}(Me_2SiO)_{0.22}$ (where Ph is phenyl group, and Me is methyl group) and having the glass transition point of 65° C.

A uniform solution of a thermoplastic silicone resin and a platinum compound was produced by adding 0.25 kilograms (kg) of 1,3-divinyltetramethyidisiloxane, 250 kg of dichloromethane, and 10.0 kg of toluene solution of platinum-1,3-divinyltetramethyldisiloxane complex (with a 2.0 wt. % platinum metal and a 6.0 wt. % 1,3-divinyltetramethyldichlorosilane) to 83.3 kg of the aforementioned toluene solution of the thermoplastic silicone resin.

The obtained uniform solution was continuously sprayed via a dual-flow nozzle into a spray-dryer through which heated nitrogen gas was directed. The temperature of the nitrogen gas was 80° C. at the spray dryer's inlet and 50° C. at the spray dryer's outlet. Microparticles produced in this process were recovered using a bag filter in the form of platinum-containing thermoplastic resin microparticles with an average diameter of 7 μm and a 0.39 wt. % content of platinum.

REFERENCE EXAMPLE 2

Preparation of Microparticles of a Platinum-Containing Polycarbonate Resin

A uniform solution was prepared from 25 kg of a polycarbonate resin (the product of Mitsubishi Gas Chemical Co., Inc., trademark "lupilon H-3000", glass transition point 145 to 150° C.), 40 kg of toluene, 425 kg of dichloromethane, 5.0 kg of a toluene solution of platinum-1,3-divinyltetramethyidisiloxane complex (with a 2.0 wt. % platinum metal and a 6.0 wt. % 1,3-divinyltetrainethyldichlorosilane), and 0.25 kg of syn-dimethyldiphenyidivinyldisiloxane. The obtained uniform solution was continuously sprayed via a dual-flow nozzle into a spray-drier through which heated nitrogen gas was directed. The temperature of the nitrogen gas was 100° C. at the spray dryer's inlet and 70° C. at the spray dryer's outlet. Microparticles produced in this process were recovered using a bag filter in the form of platinum-containing polycarbonate resin microparticles with an average diameter of 1.8 μm and a 0.40 wt. % content of platinum.

PRACTICAL EXAMPLE 1

A room-temperature-curable organopolysiloxane composition was prepared by uniformly mixing the following components under conditions isolated from humid air: 58 parts of a dimethylpolysiloxane having both molecular terminals capped with trimethoxysiloxy groups (viscosity of 16000 mPa·s), 6 parts of a dry-process silica powder having the BET-method specific surface area of 130 square meters per gram (m2/g) surface-coated with hexamethyidisilazane, 22 parts of quartz powder with a 5 µm average particle diameter, 6 parts of cerium oxide powder with a 5 µm average particle diameter, 3 parts of titanium oxide powder with 0.2 µm average particle diameter, 1 part of acetylene black (purchased from DENKI KAGAKU KOGYO K.K. as trademark DENKA BLACK) with 35 nanometer (nm) average particle diameter, 2 parts of methyltrinethoxysilane, 2 parts of a curing acceleration catalyst in the form of diisopropoxybis (ethylacetate) titanium, and 0.8 parts of the platinum-containing thermoplastic silicone resin prepared in Reference Example 1 (with 32 ppm of platinum metal in the compound). The obtained composition was sealed in an aluminum tube. The composition was then loaded into a sheet-forming mold and cured for 7 days at 60% relative humidity and at 25° C. As a result, a 0.8 mm-thick silicone-rubber sheet was produced. This sheet was cut to form 127 mm-long, 12.7 mm-wide, and 0.8 mm-thick specimens. The specimens were tested with regard to the initial flame-retarding properties and the same properties after curing. The results are shown in Table 1.

PRACTICAL EXAMPLE 2

A room-temperature-curable organopolysiloxane composition was prepared by uniformly mixing the following components under conditions isolated from humid air: 58 parts of a dimethylpolysiloxane having both molecular terminals capped with trimethoxysiloxy groups (viscosity of 16000 mPa·s), 6 parts of a dry-process silica powder having the BET-method specific surface area of 130 m$^2$/g surface-coated with hexamethyidisilazane, 22 parts of quartz powder with 5 µm average particle diameter, 6 parts of cerium oxide powder with 5 µm average particle diameter, 3 parts of titanium oxide powder with 0.2 µm average particle diameter, 1 part of acetylene black (purchased from DENKI KAGAKU KOGYO K.K. as trademark DENKA BLACK) with a 35 nm average particle diameter, 2 parts of methyltrimethoxysilane, 2 parts of a curing acceleration catalyst in the form of diisopropoxybis (ethylacetate) titanium, and 0.8 parts of the platinum-containing thermoplastic silicone resin prepared in Reference Example 2 (with 32 ppm of platinum metal in the composition). The obtained composition was sealed in an aluminum tube. The composition was then loaded into a sheet-forming mold and cured for 7 days at 60% relative humidity and at 25° C. As a result, a 0.8 mm-thick silicone-rubber sheet was produced. This sheet was cut to form 127 mm-long, 12.7 mm-wide, and 0.8 mm-thick specimens. The specimens were tested with regard to the initial flame-retarding properties and the same properties after curing. The results are shown in Table 1.

COMPARATIVE EXAMPLE 1

A room-temperature-curable organopolysiloxane was prepared in the same manner as in Practical Example 1, with the exception that 0.16 parts of a toluene solution of a platinum-1,3-divinyltetramethyldisiloxane complex (which was an initial raw material for the preparation of a platinum-containing silicone resin microparticles and which contained 2.0 wt. % of platinum metal and 6.0 wt. % of 1,3-divinyltetramethyldisiloxane) (the content of platinum metal in the entire composition was 32 ppm) were used instead of the platinum-containing silicone resin microparticles obtained in Reference Example 1. The specimens were tested with regard to the initial flame-retarding properties and the same properties after curing. The results are shown in Table 1.

COMPARATIVE EXAMPLE 2

A composition was prepared in the same manner as in Practical Example 1, with the exception that the platinum-containing silicone resin microparticles were not added. A room-temperature-curable organopolysiloxane composition was prepared by the same method as in Practical Example 1. Specimens were produced from the obtained composition in the same manner as in Practical Example 1. The specimens were tested with regard to the initial flame-retarding properties and the same properties after curing. The results are shown in Table 1.

TABLE 1

|  | Pr. Ex. 1 | Pr. Ex. 2 | Comp. Ex. 1 | Comp. Ex. 2 |
|---|---|---|---|---|
| Composition (parts) |  |  |  |  |
| Dimethylpolysiloxane | 58 | 58 | 58 | 58 |
| Silica powder | 6 | 6 | 6 | 6 |
| Quartz powder | 22 | 22 | 22 | 22 |
| Cerium oxide powder | 6 | 6 | 6 | 6 |
| Titanium oxide powder | 3 | 3 | 3 | 3 |
| Acetylene black | 1 | 1 | 1 | 1 |
| Methyltrimethoxysilane | 2 | 2 | 2 | 2 |
| Curing acceleration catalyst | 2 | 2 | 2 | 2 |
| Platinum-containing silicone resin microparticles | 0.8 |  |  |  |
| Platinum-containing polycarbonate resin microparticles |  | 0.8 |  |  |
| Platinum compound |  |  | 0.16 |  |
| Content of platinum metal in the composition (ppm) | 32 | 32 | 32 | 0 |
| Flame-retarding properties |  |  |  |  |
| Initial flame-retarding properties: |  |  |  |  |
| Total ignition time (sec.) | 33 | 15 | 37 | 168 |
| Maximum ignition time (sec.) | 8 | 2 | 8 | 35 |
| Results of evaluation by UL94 criteria | 94V-0 | 94V-0 | 94V-0 | Not acceptable |
| Flame-retarding properties after curing (70° C./7 days) |  |  |  |  |
| Total ignition time (sec.) | 43 | 13 | 54 | 161 |
| Maximum ignition time (sec.) | 10 | 4 | 21 | 36 |
| Results of evaluation by UL94 criteria | 94V-0 | 94V-0 | 94V-1 | Not acceptable |
| Flame-retarding properties after curing (150° C./21 days) |  |  |  |  |
| Total ignition time (sec.) | 55 | 30 | Entirely burned | — |
| Maximum ignition time (sec.) | 12 | 7 | Entirely burned | — |
| Results of evaluation by UL94 criteria | 94V-1 | 94V-0 | Entirely burned | — |

94V-0 means that burning stops within 10 seconds after two applications of ten seconds each of a flame to a test bar. No flaming drips are allowed.
94V-1 means that burning stops within 60 seconds after two applications of ten seconds each of a flame to a test bar. No flaming drips are allowed.

PRACTICAL EXAMPLE 3 To 8, COMPARATIVE EXAMPLE 3 To 5

Components shown in Table 2 (in parts by weight) were uniformly mixed under conditions isolated from humid air to produce 14 different room-temperature-curable organopolysiloxane compositions.

The obtained compositions were sealed in aluminum tubes. Those compositions were then loaded into a sheet-forming mold and cured for 7 days at 60% relative humidity and at 25° C. As a result, a 0.8 mm-thick silicone-rubber sheets were produced. These sheets were cut to form 127 mm-long, 12.7 mm-wide, and 0.8 mm thick specimens. The specimens were tested with regard to the initial flame-retarding properties and the same properties after curing. The results are shown in Table 2.

In the attached Table 2, dimethylpolysiloxane had molecular terminals capped with trimethoxysiloxy groups (viscosity of 16000 mPa·s), platinum compound was a 1,3-divinyltetramethyldisiloxane solution of a platinum-1,3-divinyltetramethyldisiloxane complex (OMG Precious Metals Japan Co., Ltd., trademark Pt-VTSC, 12 wt. % of platinum metal), and platinum-containing polycarbonate resin microparticles was produced in Reference Example 2.

In the Table 2, below inorganic powder were used.

Quartz powder was purchased from K.K. TATSUMORI as trademark CRISTALITE VX-S2, Average particle diameter was 5 μm.

Titanium oxide powder was purchased from ISHIHARA SANGYO K.K. as trademark TAIPAQUE R-630, Average particle diameter was 0.2 μm.

Aluminum hydroxide powder was purchased from SHOWA DENKO K.K. as trademark HIGILITE H 42 M. Particle size was 1.1 μm.

Zinc carbonate powder was purchased from CHYUO DENKI KOGYO K.K.. Average particle diameter was 9 μm.

Aluminum oxide powder was purchased from SHOWA DENKO K.K. as trademark ALUMINA AS-40. Particle size was 12 μm.

Magnesium hydroxide powder was purchased from WAKO PURE CHEMICAL INDUSTRIES, Ltd..

Practical examples 1 to 8 and Comparative Examples 1 to 5 show that the room-temperature-curable organopolysiloxane composition of the invention comprises aforementioned components (A) through (D), and especially, since it includes component (C) in the form of specific platinum-containing thermoplastic resin microscopic particles functioning as an agent for imparting to the composition flame-retarding properties, the composition ensures excellent flame-retarding properties which are not lost in cured silicone articles even after long exposure to high temperatures.

REFERENCE EXAMPLE 3

Preparation of a Platinum Compound Composition

A platinum compound composition (A) was prepared by adding 10 g of 1,3-divinyl-1,3-diphenyidimethyldisiloxane to 10 g of a 1,3-divinyltetramethyldisiloxane solution of a platinum-1,3-divinyltetramethyldisiloxane complex (OMG Precious Metals Japan Co., Ltd., trademark Pt-VTSC, 12 wt. % of platinum metal). The components were uniformly mixed.

REFERENCE EXAMPLE 4

Preparation of a Platinum Compound Composition 100 g of 1,3-divinyl-1,3-diphenyidimethyldisiloxane were added to 100 g of a 1,3-divinyltetramethyidisiloxane solution of platinum-1,3-divinyltetramethyidisiloxane complex (OMG Precious Metals Japan Co., Ltd., trademark Pt-VTSC, 12 wt. % of platinum metal). After the components were mixed, the 1,3-divinyltetramethyidisiloxane was removed by distillation in vacuum under pressure of 0.03 Torr and at a temperature of 50° C. As a result, the platinum compound composition (B) was produced.

TABLE 2

|  | Practical Examples | | | | | | Comparative Examples | | |
| --- | --- | --- | --- | --- | --- | --- | --- | --- | --- |
|  | 3 | 4 | 5 | 6 | 7 | 8 | 3 | 4 | 5 |
| Dimethylpolysiloxane | 26.4 | 23.4 | 25.4 | 32.4 | 9.4 | 39.8 | 26.4 | 23.4 | 93.6 |
| Quartz Powder | 72 |  |  |  |  |  | 72 |  |  |
| Titanium oxide powder |  | 75 |  |  |  |  |  | 75 |  |
| Aluminum hydroxide powder |  |  | 73 |  |  |  |  |  |  |
| Zinc carbonate powder |  |  |  | 66 |  |  |  |  |  |
| Aluminum oxide powder |  |  |  |  | 90 |  |  |  |  |
| Magnesium hydroxide powder |  |  |  |  |  | 60 |  |  |  |
| Methyltrimethoxysilane | 0.8 | 0.8 | 0.8 | 0.8 | 0.3 | 1.2 | 0.8 | 0.8 | 3.2 |
| Curing accelration catalyst | 0.8 | 0.8 | 0.8 | 0.8 | 0.3 | 1.2 | 0.8 | 0.8 | 3.2 |
| Platinum-containing polycarbonate resin microparticles | 0.8 | 0.8 | 0.8 | 0.8 | 0.8 | 0.8 |  |  | 0.8 |
| Platinum compound |  |  |  |  |  |  | 0.027 | 0.027 |  |
| Flame-retarding properties |  |  |  |  |  |  |  |  |  |
| Initial flame-retarding properties |  |  |  |  |  |  |  |  |  |
| Total ignition time (sec) | 46 | 28 | 0 | 18 | 15 | 4 | 32 | 33 | Entirely |
| Maximum ignition time (sec) | 10 | 6 | 0 | 5 | 5 | 2 | 10 | 8 | burned |
| Results of evaluation by UL94 criteria | 94V-0 | 94V-0 | 94V-0 | 94V-0 | 94V-0 | 94V-0 | 94V-0 | 94V-0 |  |
| Flame-retarding properties after curing (70° C./5 days) |  |  |  |  |  |  |  |  |  |
| Total ignition time (sec) | 38 | 30 | 0 | 4 | 7 | 5 | 55 | 69 | Entirely |
| Maximum ignition time (sec) | 10 | 8 | 0 | 2 | 4 | 2 | 14 | 22 | burned |
| Results of evaluation by UL94 criteria | 94V-0 | 94V-0 | 94V-0 | 94V-0 | 94V-0 | 94V-0 | 94V-1 | 94V-1 |  |

94V-0 means that burning stops within 10 seconds after two applications of ten seconds each of a flame to a test bar. No flaming drips are allowed.
94V-1 means that burning stops within 60 seconds after two applications of ten seconds each of a flame to a test bar. No flaming drips are allowed.

PRACTICAL EXAMPLE 9

A room-temperature-curable organopolysiloxane composition was prepared by uniformly mixing the following components under conditions isolated from humid air: 58 parts of a dimethylpolysiloxane having molecular terminals capped with trimethoxysiloxy groups (viscosity of 16000 mPa·s), 6 parts of a dry-process silica powder (the BET-method specific surface area of 130 m²/g) surface-coated with hexamethyldisilazane, 22 parts of quartz powder with 5 μm average particle diameter, 6.parts of cerium oxide powder with 5 μm average particle diameter, 3 parts of titanium oxide powder with a 0.2 μm average particle diameter, 1 part of acetylene black (purchased from DENKI KAGAKU KOGYO K.K. as trademark DENKA BLACK) with 35 nm average particle diameter, 2 parts of methyltrimethoxysilane, 2 parts of a curing acceleration catalyst in the form of diisopropoxybis (ethylacetate) titanium, 0.027 parts of 1,3-divinyltetramethyldisiloxane solution of platinum-1,3-divinyltetram ethyldisiloxane complex (with 32 ppm of platinum metal), and 0.027 parts of 1,3-divinyl-1,3-diphenyldimethyldisiloxane.

The obtained composition was sealed in an aluminum tube. The composition was then loaded into a sheet-forming mold and cured for 7 days at 60% relative humidity and at 25° C. As a result, a 0.8 mm-thick silicone-rubber sheet was produced. This sheet was cut to form 127 mm-long, 12.7 mm-wide, and 0.8 mm thick specimens. The specimens were tested with regard to the initial flame-retarding properties and the same properties after curing. The results are shown in Table 3.

PRACTICAL EXAMPLE 10

A composition was prepared in the same manner as in Practical Example 9, with the exception that, 0.054 parts of the platinum compound composition (A) produced in Reference Example 3 were used instead of the 1,3-divinyl-1,3-diphenyldimethyldisiloxane and the 1,3-divinyltetramethyidisiloxane solution of the platinum-1,3-divinyltetramethyidisiloxane complex of Practical Example 9. Specimens were produced from the obtained composition in the same manner as in Practical Example 9. The specimens were tested with regard to the initial flame-retarding properties and the same properties after curing. The results are shown in Table 3.

PRACTICAL EXAMPLE 11

A composition was prepared in the same manner as in Practical Example 9, with the exception that, 0.032 parts of the platinum compound composition (B) produced in Reference Example 4 were used instead of the 1,3-divinyl-1,3-diphenyidimethyldisiloxane and the 1,3-divinyltetramethyl-disiloxane solution of the platinum-1,3-divinyltetramethyldisiloxane complex of Practical Example 9. Specimens were produced from the obtained composition in the same manner as in Practical Example 9. The specimens were tested with regard to the initial flame-retarding properties and the same properties after curing. The results are shown in Table 3.

COMPARATIVE EXAMPLE 6

A room-temperature-curable organopolysiloxane was prepared in the same manner as in Practical Example 9, with the exception the 1,3-divinyl-1,3-diphenyldimethyldisiloxane was not added. Specimens were produced from the obtained composition in the same manner as in Practical Example 9. The specimens were tested with regard to the initial flame-retarding properties and the same properties after curing. The results are shown in Table 3.

TABLE 3

| | Pr. Ex. 9 | Pr. Ex. 10 | Pr. Ex. 11 | Comp. Ex. 6 |
|---|---|---|---|---|
| Composition (parts) | | | | |
| Dimethylpolysiloxane | 58 | 58 | 58 | 58 |
| Silica powder | 6 | 6 | 6 | 6 |
| Quartz powder | 22 | 22 | 22 | 22 |
| Cerium oxide powder | 6 | 6 | 6 | 6 |
| Titanium oxide powder | 3 | 3 | 3 | 3 |
| Acetylene black | 1 | 1 | 1 | 1 |
| Methyltrimethoxysilane | 2 | 2 | 2 | 2 |
| Curing acceleration catalyst | 2 | 2 | 2 | 2 |
| Platinum-1,3-divinyltetramethyldisiloxane complex | 0.027 | | | 0.027 |
| 1,3-divinyl-1,3-diphenyldimethyldisiloxane | 0.027 | | | |
| Platinum compound (A) | | 0.054 | | |
| Platinum compound (B) | | | 0.032 | |
| Content of platinum metal in the compound (ppm) | 32 | 32 | 32 | 32 |
| Flame-retarding properties Initial flame-retarding properties: | | | | |
| Total ignition time (sec.) | 22 | 16 | 12 | 37 |
| Maximum ignition time (sec.) | 5 | 4 | 4 | 8 |
| Results of evaluation by UL94 criteria | 94V-0 | 94V-0 | 94V-0 | 94V-0 |
| Flame-retarding properties after curing (70° C./7 days) | | | | |
| Total Ignition time (sec) | 16 | 12 | 10 | 54 |
| Maximum ignition time (sec.) | 3 | 3 | 3 | 21 |
| Results of evaluation by UL94 criteria | 94V-0 | 94V-0 | 94V-0 | 94V-1 |

94V-0 means that burning stops within 10 seconds after two applications of ten seconds each of a flame to a test bar. No flaming drips are allowed.
94V-1 means that burning stops within 60 seconds after two applications of ten seconds each of a flame to a test bar. No flaming drips are allowed.

Practical Examples 9, 10, and 11 and Comparative Example 6 show that the room-temperature-curable organopolysiloxane composition of the invention consists of aforementioned components (A) through (D), and especially, since it includes component (C1) in the form of a platinum compound and component (C2) in the form of an organopolysiloxane with an aryl group and an alkenyl group, the composition ensures excellent flame-retarding properties which are not lost in cured silicone articles even after long exposure to high temperatures. Furthermore, the invention provides a method for efficient manufacturing of the aforementioned room-temperature-curable organopolysiloxane composition.

What is claimed is:
1. A condensation-curable organopolysiloxane composition consisting essentially of:
(A) 100 parts by weight of an organopolysiloxane having a viscosity from 100 to 500,000 mPa·s at 25° C. and having in one molecule 1.5 or more end groups represented by the following general formula: $(X)_a R^1_{3-a}$ Si—, wherein each X is independently selected from the group consisting of a hydroxyl group and a hydrolyzable group, each $R^1$ is independently selected from the group consisting of a monovalent hydrocarbon group and a halogen-substituted monovalent hydrocarbon group, and a is 1, 2, or 3;

(B) 0.01 to 40 parts by weight of a cross-linking agent selected from a group consisting of a silane or a siloxane oligomer, wherein the cross-linking agent has three or more silicon-bonded hydrolyzable groups per molecule;

(C1) a flame retardant comprising a platinum compound present in an amount such that metallic platinum is present in an amount of 1 to 2,000 ppm based on the weight of the composition;

(C2) an organosiloxane oligomer, where the organosiloxane oligomer contains aryl and alkenyl groups, the organosiloxane oligomer has 8 or less silicon atoms per molecule, and the organosiloxane oligomer contains in each molecule at least one divalent organosiloxane group represented by the formula $$—(R^2)(R^3)SiO—(R^2)(R^3)Si—$$

wherein $R^2$ is an aryl group, and $R^3$ is an alkenyl group;

wherein the organosiloxane oligomer is present in a quantity such that the composition contains at least 2 moles of component (C2) per 1 mole of platinum atoms in component (C1); and (D) 5 to 300 parts by weight of an inorganic powder.

2. The composition of claim 1, where component (C1) is a platinum complex having as a ligand an organosiloxane which contains alkyl and alkenyl groups having in one molecule at least one divalent organosiloxane group shown by formula:

$$—(R^3)(R^4)SiO—(R^3)(R^4)Si—,$$

wherein $R^3$ is an alkenyl group, and $R^4$ is an alkyl group with 6 or less carbon atoms, component (C1) contains in one molecule an alkyl group and an alkenyl group, and component (C1) has 8 or less silicon atoms; or a mixture of the organosiloxane with the platinum complex.

3. The composition of claim 1, wherein component (C2) is 1,3-divinyl-1,3-diphenyldimethyldisiloxane.

4. The composition of claim 1 wherein each X in component (A) is independently an alkoxy group, and each hydrolyzable group in component (B) is independently an alkoxy group.

5. The composition of claim 1, wherein component (D) is selected from the group consisting of a reinforcing silica powder, quartz powder, cerium oxide powder, titanium oxide powder, carbon black, aluminum hydroxide powder, calcium carbonate powder, aluminum oxide powder, magnesium hydroxide powder, magnesium carbonate powder, zinc carbonate powder, or a mixture thereof.

6. The composition of claim 5, where the reinforcing silica powder is a dry-process silica.

7. The composition of claim 6, where the surface of the dry-process silica is treated with a hydrophobic agent selected from the group consisting of a trimethylchlorosilane, dimethylchlorosilane, hexamethyldisilazane, and octamethylcyclotetrasiloxane.

8. The composition of claim 1 wherein component (D) is a mixture of a reinforcing silica powder, quartz powder, cerium oxide powder, and carbon black.

9. The composition of claim 1 wherein component (D) is a mixture of a reinforcing silica powder, quartz powder, cerium oxide powder, titanium oxide powder, and carbon black.

10. A composition as set forth in claim 1 having a maximum ignition time of 10 seconds or less as determined by UL94.

11. A composition as set forth in claim 1 that is cured and has a maximum ignition time of 12 seconds or less as determined by UL94.

12. A method of preparing a condensation-curable organopolysiloxane composition comprising the steps of:

(1) adding (C1) a flame retardant comprising a platinum compound, in an amount such that metallic platinum is present in an amount of 1 to 2,000 ppm based on the weight of the condensation-curable organopolysiloxane composition, to a composition comprising:

(A) 100 parts by weight of an organopolysiloxane having a viscosity from 100 to 500,000 mPa·s at 25° C. and having in one molecule 1.5 or more end groups represented by the following general formula: $(X)_a R^1_{3-a}Si$—, where each X is independently selected from the group consisting of a hydroxyl group and a hydrolyzable group, each $R^1$ is independently selected from the group consisting of a monovalent hydrocarbon group and a halogen-substituted monovalent hydrocarbon group, and a is 1, 2, or 3;

(B) 0.01 to 40 parts by weight of a cross-linking agent selected from a group consisting of a silane or a siloxane oligomer, wherein the cross-linking agent has three or more silicon-bonded hydrolyzable groups per molecule;

(C2) an organosiloxane oligomer, where the organosiloxane oligomer contains aryl and alkenyl groups, the organosiloxane oligomer has 8 or less silicon atoms per molecule, and the organosiloxane oligomer contains in each molecule at least one divalent organosiloxane group as represented by the formula $$—(R^2)(R^3)SiO—(R^2)(R^3)Si—$$

wherein $R^2$ is an aryl group, and $R^3$ is an alkenyl group;

where the organosiloxane oligomer is present in a quantity such that the composition contains at least 2 moles of component (C2) per 1 mole of platinum atoms in component (C1); and (D) 5 to 300 parts by weight of an inorganic powder; and (2) curing the condensation-curable organopolysiloxane composition via a condensation reaction, wherein the condensation-curable organopolysiloxane composition consists essentially of the (A) organopolysiloxane, the (B) cross-linking agent, the (C1) flame retardant, the (C2) organosiloxane oligomer, and the (D) inorganic powder.

13. A method as set forth in claim 12 wherein the composition has a maximum ignition time of 10 seconds or less as determined by UL94.

14. A method as set forth in claim 12 wherein the composition that is cured has a maximum ignition time of 12 seconds or less as determined by UL94.

15. A product prepared by the method of claim 12.

16. A method of preparing a condensation-curable organopolysiloxane composition comprising the steps of:

(1) pre-mixing (C1) a flame retardant comprising a platinum compound, in an amount such that metallic platinum is present in an amount of 1 to 2,000 ppm based on the weight of the condensation-curable organopolysiloxane composition, with (C2) an organosiloxane oligomer, where the organosiloxane oligomer contains aryl and alkenyl groups, the organosiloxane oligomer has 8 or less silicon atoms per molecule, and the organosiloxane oligomer contains in each molecule at least one divalent organosiloxane group as represented by the formula —$(R^2)(R^3)SiO$—$(R^2)(R^3)Si$— wherein $R^2$ is an aryl group, and $R^3$ is an alkenyl group; where the organosiloxane oligomer is present in a quantity such that the composition contains at least 2 moles of component (C2) per 1 mole of platinum atoms in component (C1) to form a mixture;

(2) combining the mixture with:
(A) 100 parts by weight of an organopolysiloxane having a viscosity from 100 to 500,000 mPa·s at 25° C. and having in one molecule 1.5 or more end groups represented by the following general formula: $(X)_a R^1_{3-a} Si$—, where each X is independently selected from the group consisting of a hydroxyl group and a hydrolyzable group, each $R^1$ is independently selected from the group consisting of a monovalent hydrocarbon group and a halogen-substituted monovalent hydrocarbon group, and a is 1, 2, or 3;

(B) 0.01 to 40 parts by weight of a cross-linking agent selected from a group consisting of a silane or a siloxane oligomer, wherein the cross-linking agent has three or more silicon-bonded hydrolyzable groups per molecule; and
(D) 5 to 300 parts by weight of an inorganic powder to form the condensation-curable organopolysiloxane composition; and
(3) curing the condensation-curable organopolysiloxane composition via a condensation reaction, wherein the condensation-curable organopolysiloxane composition consists essentially of the (A) organopolysiloxane, the (B) cross-linking agent, the (C1) flame retardant, the (C2) organosiloxane oligomer, and the (D) inorganic powder.

17. A method as set forth in claim 16 wherein the composition has a maximum ignition time of 10 seconds or less as determined by UL94.

18. A method as set forth in claim 16 wherein the composition that is cured has a maximum ignition time of 12 seconds or less as determined by UL94.

* * * * *